United States Patent [19]

Rajagopal

[11] Patent Number: 4,580,172
[45] Date of Patent: Apr. 1, 1986

[54] OPTICAL SCANNER FOR AUTOMATIC DOCUMENT HANDLER

[75] Inventor: Ganesh Rajagopal, Richardson, Tex.

[73] Assignee: The Mead Corporation, Dayton, Ohio

[21] Appl. No.: 627,257

[22] Filed: Jul. 2, 1984

[51] Int. Cl.[4] .......................... H04N 1/10; H04N 1/04
[52] U.S. Cl. .................................. 358/293; 358/285; 358/287; 355/8
[58] Field of Search ............... 358/285, 293, 294, 287; 355/8

[56] References Cited

U.S. PATENT DOCUMENTS

| | | | |
|---|---|---|---|
| 4,227,219 | 10/1980 | Takemoto | 358/293 |
| 4,348,697 | 9/1982 | Takahashi et al. | 358/293 |
| 4,422,100 | 12/1983 | DuVall et al. | 358/294 |
| 4,429,333 | 1/1984 | Davis et al. | 358/293 |
| 4,520,400 | 5/1985 | Koumura | 358/293 |

*Primary Examiner*—Howard W. Britton
*Assistant Examiner*—John K. Peng
*Attorney, Agent, or Firm*—Biebel, French & Nauman

[57] ABSTRACT

A document handling machine which is capable of operating at two different fields of view, namely, a wide field of view and a narrow field, of view, incorporates a scanning carriage which moves generally parallel to the plane of a plurality of document copying platens. The scanner carriage incorporates a lens assembly which includes a lens and a CCD array, which assembly is movable within the carriage along the direction of scan and transverse to the direction of scan to define the two fields of view. Movement of the lens array between the respective fields of view is accomplished by interposing a relatively fixed stop which is engaged by the lens assembly while the carriage is being traversed along its main guideways by a scanning drive motor. The fixed stop is selectively engageable with the lens assembly while the carriage is moving, to cause the lens assembly to shift on the carriage between its respective fields of view. A centering roller mechanism on the carriage engages the lens assembly and detents the same in each of the fields of view while providing for guiding movement of the same, by a roller which moves within an inclined guideway on the lens assembly, between the fields of view.

13 Claims, 12 Drawing Figures

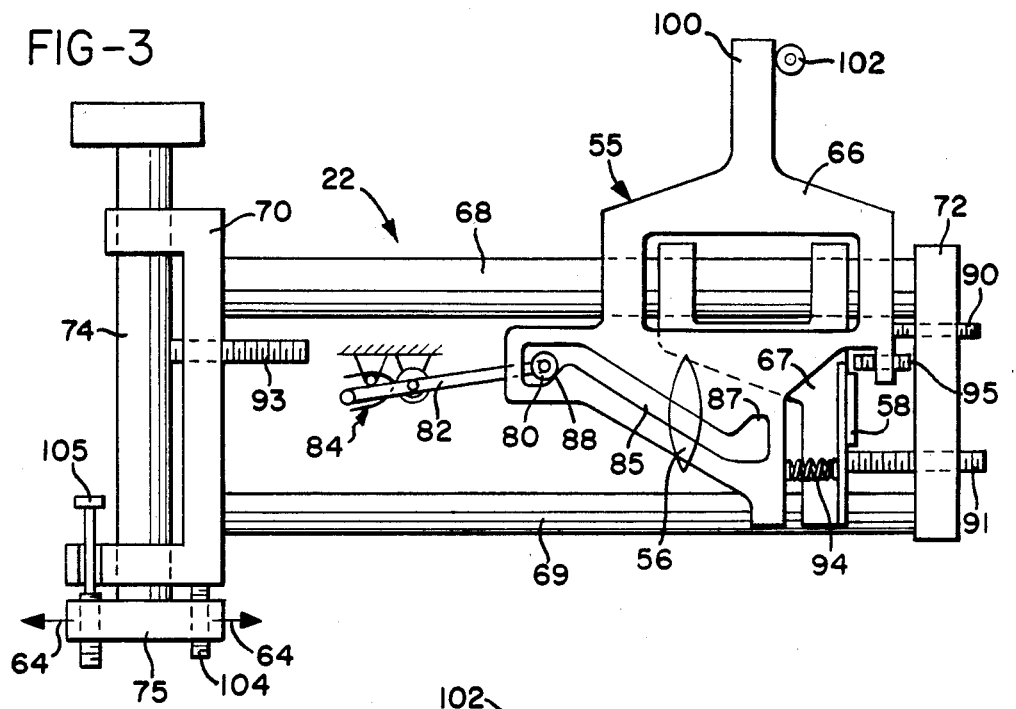
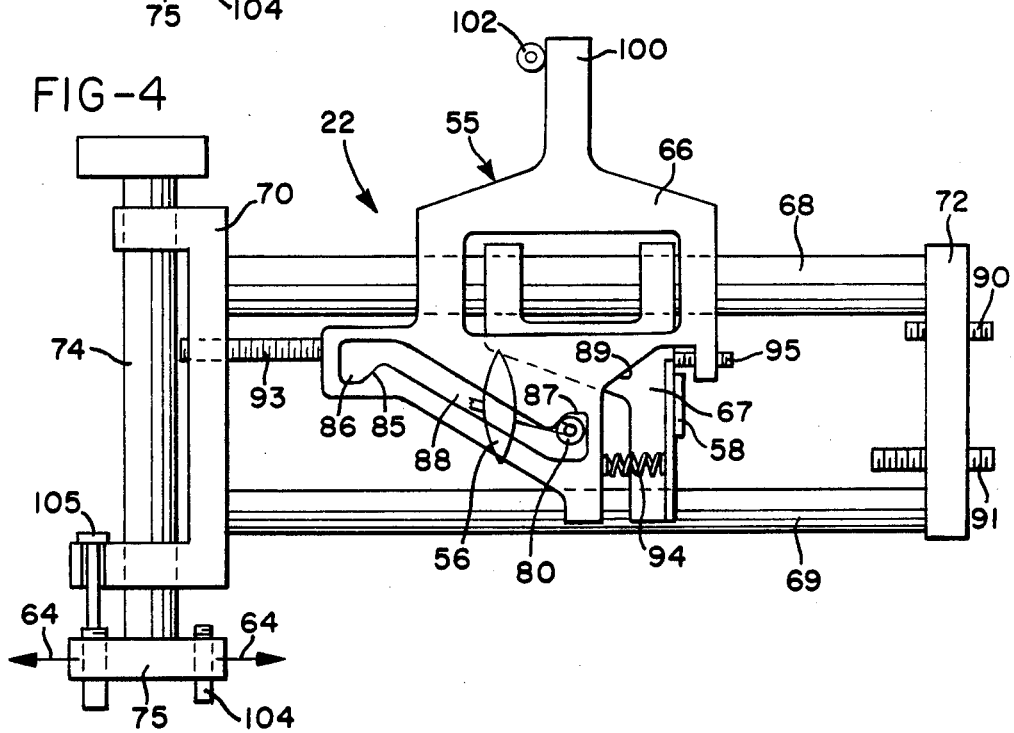

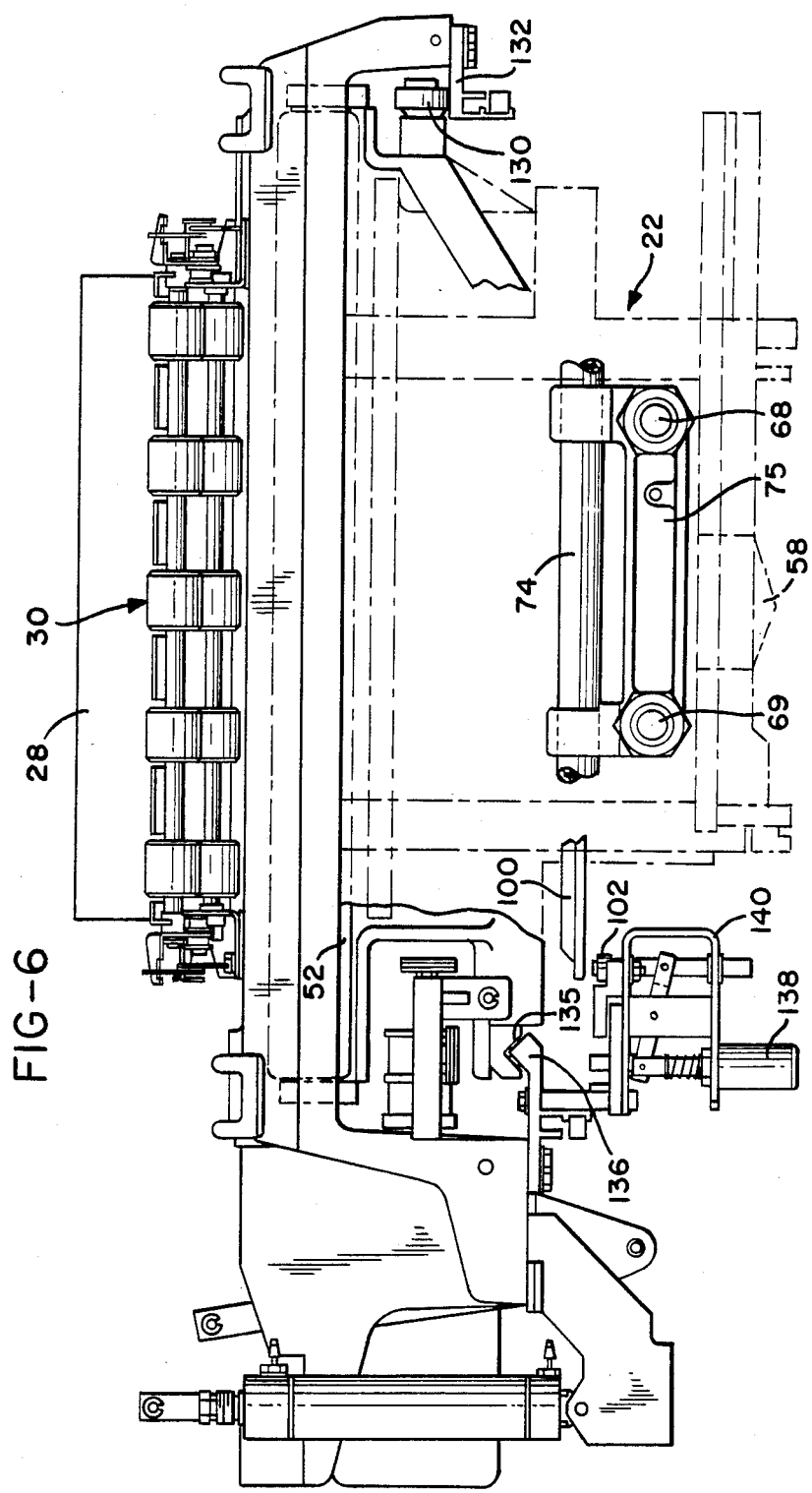

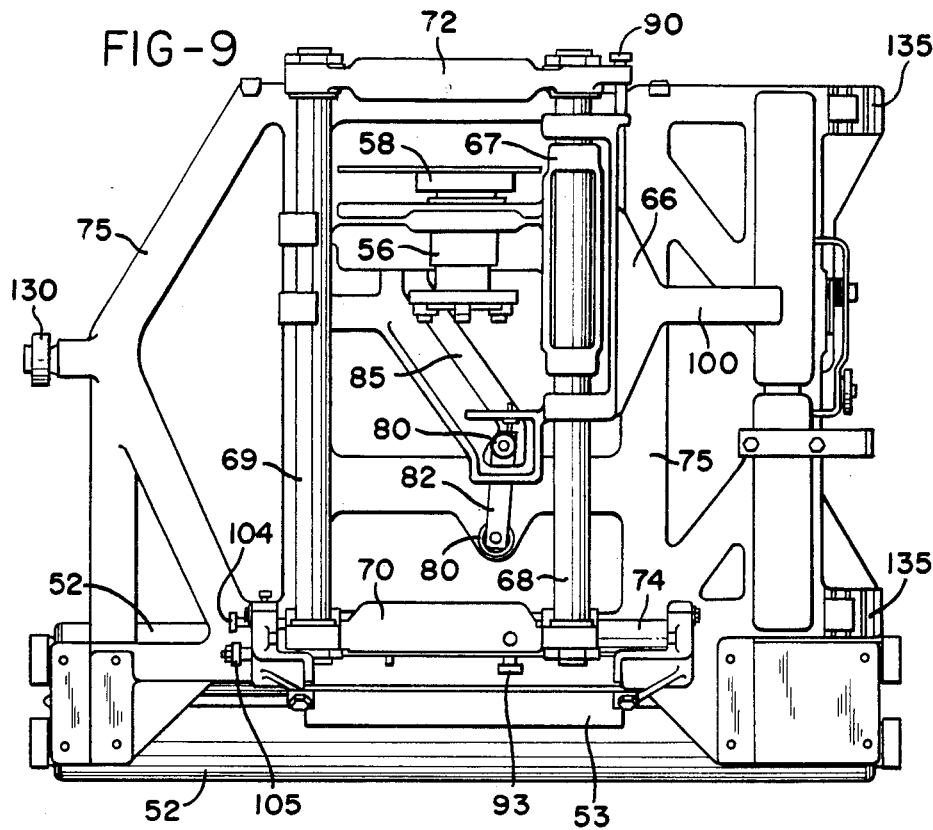
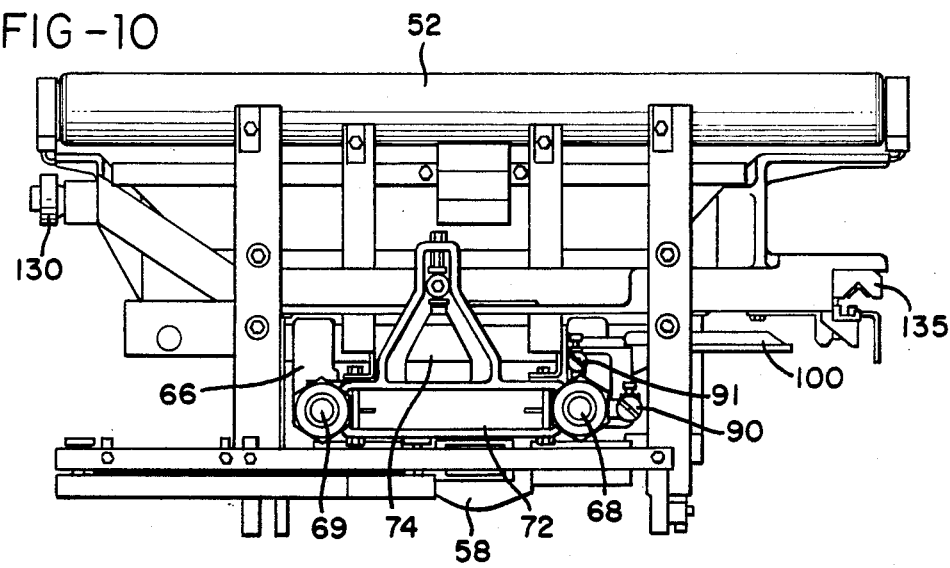

OPTICAL SCANNER FOR AUTOMATIC DOCUMENT HANDLER

BACKGROUND OF THE INVENTION

This invention relates to reprographic systems and more particularly to an automatic document handler including a scanner with an imaging lens and a photodetector device, such as a CCD array. The invention is more particularly directed to such a system which is adapted to copy original documents of two different sizes, such as a nominal 8½" in width and a nominal 11" width.

A document handler to which the present invention may be applied is described in the co-pending application of Davis et al, Ser. No. 355,826 filed Mar. 8, 1982, U.S. Pat. No. 4,429,333. The document handler of that application system is adopted to handle either individual sheets or bound documents, and generates corresponding scanning signals which are suitable for loading into a memory. Once loaded into memory, the scanned information may then be used for controlling the operation of a programmable printing device.

The document scanning system incorporates a platen for scanning bulky documents, such as books, and further incorporates two exposing stations or fixed platens for scanning the two sides of sheet-type documents. The platen for bulky documents and the two exposing stations are positioned in a common plane. When the apparatus is scanning a bulky document at the scanning platen, the scanning carriage is moved by a drive at a constant velocity along the length of the platen. However, when the scanning carriage is operating to scan individual sheet-type documents, the carriage is positioned at one or the other of the fixed scanning platens, and the automatic document handling apparatus moves the sheet document past the fixed stations at a constant velocity. Where simplex copying of an original sheet document is required, the carriage remains at one of the fixed platens which may be considered as a home position. When both sides of the sheet document are to be copied, the carriage first scans the document at one of the fixed platens and then moves to the other fixed platen, for duplex copying of the same document.

The scanning carriage itself is movable along guideways which are at least coextensive with and parallel to the three platens mentioned above. The carriage includes lamps for illuminating the documents, a folding mirror, and a lens assembly including a lens and a photoelectric pick-up array.

In such scanning apparatus, particularly automatic document handling machines, it is desirable to use a single lens and a single photoelectric pick-up, such as a CCD array, for scanning in both the narrow and wide fields of view. Since the fields of view are defined by a generally common margin along one edge, it is necessary to move the lens assembly on the carriage along the optical axis to either narrow or widen the field of view and, at the same time, to move the lens assembly in translation, that is, in a direction normal to the optical axis, so that the optical center of the lens is always at or near the center of the particular field of view which has been selected. It is also desirable that this change in lens fields be accomplished promptly and reliably on command.

SUMMARY OF THE INVENTION

The invention thus relates to a copying machine optical system which is adapted for operating at two fields in view in which the fields are defined by common margins and more particularly relates to a scanning carriage arrangement for a document copier in which the carriage is mounted for movement parallel to the plane of one or more document scanning platens. The carriage provides for the scanning of a narrow and a wide field of view joined along a common margin, such as for a view which is 8.3" wide or 11" wide.

The carriage is adapted to move along a scanning path which is generally parallel to the plane of one or more platens and incorporates a single lens assembly. The lens assembly includes a lens and a photoelectric pick-up arrangement, such as a CCD array. The lens assembly is mounted on the carriage for movement with respect to the carriage between two positions corresponding respectively to the two fields of view.

The lens assembly is preferably retained in each of its relative positions on the carriage by a detent mechanism which normally urges or retains the assembly in either of the selected positions, but which may be overcome to permit the lens assembly to move to the other position upon command.

Movement between the respective positions is accomplished by the same motor drive arrangement by which the carriage is caused to traverse or to scan. Accordingly, movement from one position to the other is accomplished by causing the carriage to traverse in a direction along its mounting guide rails, and then interposing a temporary stop into the path of movement of the lens assembly, which stop may be solenoid operated. The stop is extended, as required, either in an outward or a return movement of the carriage from a "home" position in such a manner as to intercept the lens assembly, and temporarily prevent the movement of the lens assembly with the carriage, thereby causing the lens assembly to move on its own guide rails in a shifting movement between either the wide or the narrow fields of view. This shifting movement is accomplished by causing the lens assembly to deflect or overcome the detent arrangement initially and by permitting the lens assembly to come under the influence of the detent arrangement as it nears the end of its independent travel on the carriage.

The carriage and lens assemblies are provided with adjustable stops by means of which the relative positions of the lens assembly for each of the two fields of view may be accurately controlled.

The lens assembly itself includes a lens and a photoelectric pick-up device, preferably in the form of a CCD array. The array is itself mounted for limited movement with respect to the lens against adjustable stops, and is caused to move against such stops, in each of the fields of view of the lens assembly, so that the array is accurately positioned at the plane of focus.

Preferably, a lens assembly is mounted for sliding movement in two mutually perpendicular directions with respect to the carriage. One of the directions is generally parallel to the direction of the primary scanning movement of the carriage, and the other is perpendicular thereto. For this purpose the lens assembly is preferably mounted on guide rods. The temporary stop which selectively engages the lens assembly during traversing movement of the carriage, to affect shifting of the lens assembly between the respective fields of view, is preferably operated by a push-pull solenoid. The duration of the encoder pulse from an encoder mounted on the carriage drive motor is used to sense when motion has stopped. If an encoder pulse does not appear within a certain time period, it is assumed that the carriage motion has ceased, and the control system then goes on to its next action.

The lens switching is accomplished by sending the carriage off in a given direction on its guideways from its "home" position and operating the switching solenoid in such a manner that the lens assembly is caused to be moved from one detent position to the other, either on the outbound or the return direction of the carriage to the "home" position, depending on whether the lens assembly is being switched from wide to narrow or from narrow to wide.

The detent arrangement includes a lever-mounted roller which operates along a transversely inclined cam and is preloaded by a torsion spring system which takes a given force to deflect initially in either direction of travel of the lens assembly. During the time that the roller is detented at either end of its travel, the lever provides the necessary force to keep the lens assembly firmly against its stops in either of its two positions. However, during lateral movement of the lens assembly, the roller mounted lever behaves like a fixed roller so that the lens carrier is forced to move both parallel and perpendicular to the optical axis, thus insuring that the lens assembly is fully moved to each of its two detent positions.

An important advantage of the carriage and lens shifting assembly of the present invention is that only one motor drive for the carriage is required to obtain motion of the lens assembly in either of two selected positions or directions, while still providing for full independent adjustment of the total travel of the assembly in either of its directions.

A further advantage of the arrangement resides in its relative simplicity since the lens assembly shifting arrangement portion of the carriage takes advantage of the fact that there has already been provided a carriage traverse drive motor or a carriage servomotor which may be advantageously used to shift between fields of view. It is accordingly an important object of the invention to provide a scanning carriage arrangement for a document copier in which the movement of a lens assembly in respect to the carriage, to shift between fields of view, is effected by movement of the carriage and by the temporary interposition of a stop member for engagement with the lens assembly during carriage movement.

Another object of the invention is the provision of a scanning carriage including a lens assembly which is movable on the carriage between narrow and wide fields of view.

A still further object to the invention is the provision of a carriage assembly including a single lens arrangement which is adapted for scanning at least two different fields of view corresponding to two different widths of documents to be scanned or copied, in which the fields of view are joined along a common margin.

Another object of the invention is the provision of a scanning carriage, as outlined above, including a lens assembly with a lens and a CCD array and in which the relative position of the lens and the array is adjustable with movement of the lens from a narrow to a wide field of view and back again, to maintain focus of the array with respect to the lens.

These and other objects and advantages of the invention will be apparent from the following description, the accompanying drawings and the appended claims.

BRIEF DESCRIPTION OF THE DRAWINGS

FIG. 3 is a fragmentary partially diagrammatic view of the scanning carriage with lens assembly shifting mechanism, illustrating the position of the parts in the wide field of view;

FIG. 4 is a view similar to FIG. 3 but showing the lens assembly in the narrow field of view;

FIG. 6 is an enlarged partially broken away view of the automatic document handler looking generally along the line 6—6 of FIG. 1;

FIG. 9 is a bottom view of the carriage;

FIG. 10 is an end elevation looking along line 10—10 of FIG. 8; and

BRIEF DESCRIPTION OF PREFERRED EMBODIMENT

Figure 1:
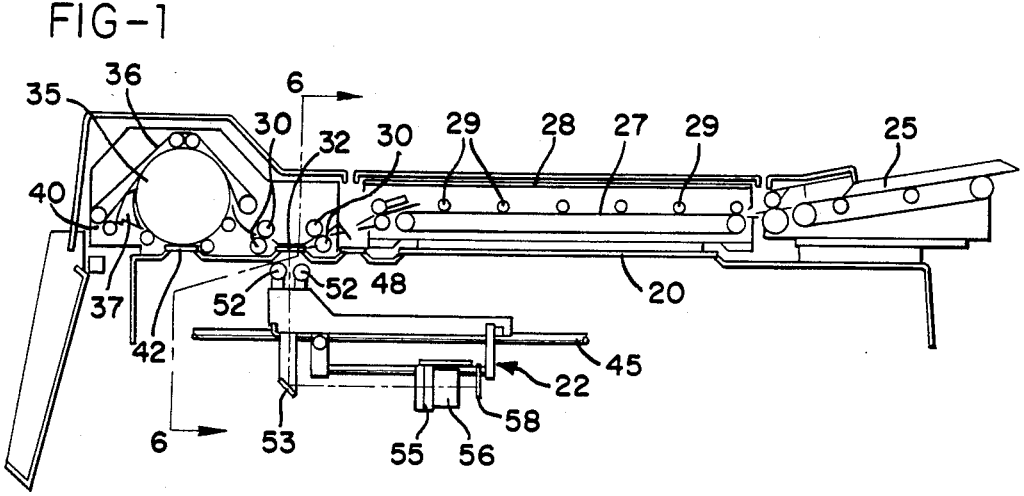
FIG. 1 is a transverse, somewhat diagrammatic view of a document handler according to this invention.

Referring to the drawings which illustrate a preferred embodiment of the invention, a somewhat diagrammatic side view of a document handler incorporating the scanner carriage system of this invention is illustrated in FIG. 1. The document handler includes a fixed glass or platen 20 which is adapted to receive bulky documents on an upper surface thereof, for scanning by a scanning carriage 22 in one mode of operation. In another mode of operation, sheet-type documents to be scanned are automatically fed by a sheet feeder 25 to transport belts 27 in a movable cover 28. The cover 28 which contains the transport belts 27, may be raised for access to the platen 20. The cover 28 also contains a series of hold-down balls 29 which cooperate with the belts 27 to urge the sheet documents downwardly into convergence with the belts. Documents ejected by the cover transport are conveyed by pinch roller pairs 30 at a controlled rate across a scanning glass or platen 32, during which one side of the document is lined scanned by the scanner incorporated into the carriage 22.

A duplex drum 35 with hold-down belts 36 transports the document from the first platen 32 to an exit station 40 for simplex operation. The drum is further provided with a diverter gate 37 for delivering the document in an inverted position to a duplex platen 42, at which point the opposite side of the document is line scanned by the scanning carriage 22. The carriage 22 is movable longitudinally of the frame of the document handler on guideways 45 parallel to the several platens. In one mode, the carriage 22 is caused to scan parallel to the scanning platen 20, and in other modes is positioned in relatively stationary relationship with respect to the simplex platen 32 or the duplex platen 42. Further, the carriage may scan a calibration platen 48, positioned between the simplex platen 32 and the bulky document platen 20. The carriage 22 is diagrammatically shown in FIG. 1 as including a pair of document illuminating lamps 52, a folding mirror 53 positioned at 45° to a light path, and a lens assembly 55 which includes a lens 56 and a CCD array 58.

The lamps 52 illuminate the document at the respective scanning platens, and exposes a line of image pixels along the face of the original document at the scanning plate. The line of image pixels, when so exposed, are imaged by the lens 56 on the CCD array 58.

Figure 2:
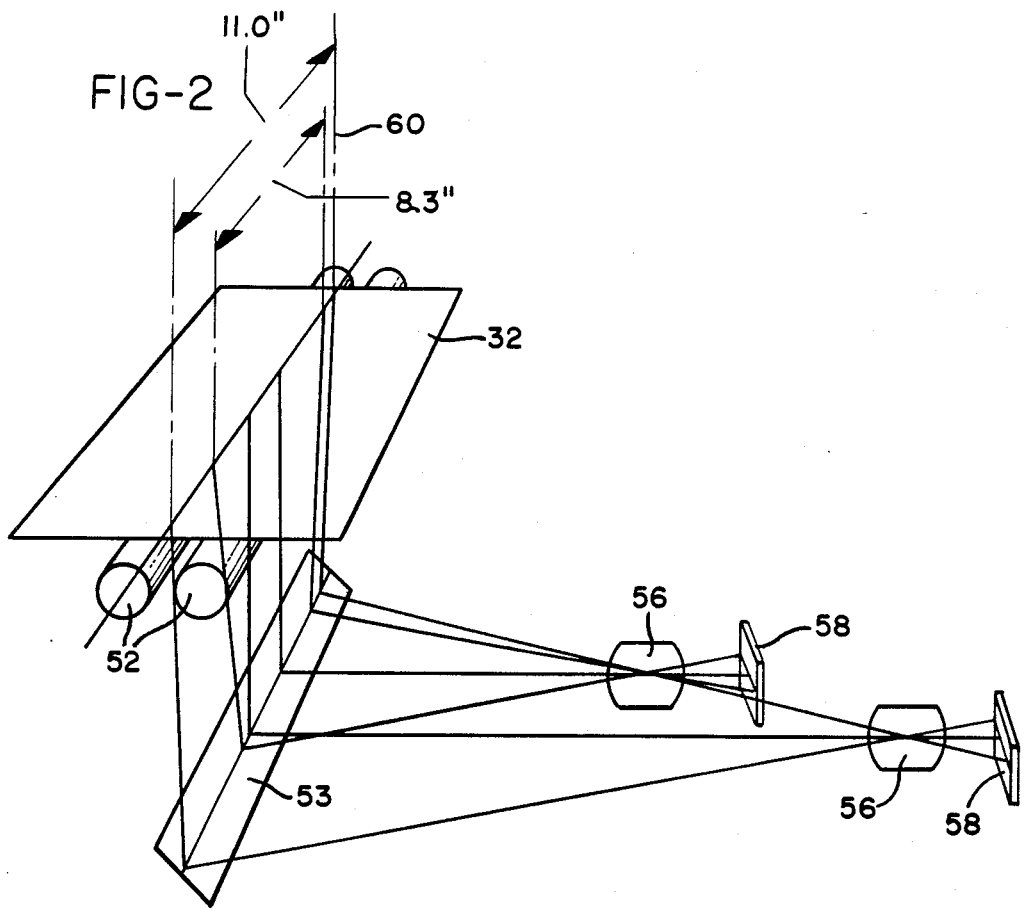
FIG. 2 is an enlarged diagrammatic view representing the optical scanning system in the narrow and wide fields of view.

FIG. 2 diagrammatically presents the optical system for the narrow and the wide fields of view. One of the platens, such as the platen 32 is illustated, in a transverse plane, which is in common with the plane of the platens 20 and 42. The optical system will scan either 8.3" or 11", as illustrated, which fields of view have a generally common registration or margin 60. In actual practice of the preferred embodiment, the two fields of view do not necessarily have a completely common registration or margin 60, and the edge of the narrow field of view may be offset a small distance, such as a tenth of an inch, from the edge of the wider field of view. However, the document to be copied, as well as the platen supporting the document, will have a single registration edge corresponding to the location of the reference line 60. The lens 56 and CCD array 58 are diagrammatically illustrated in FIG. 2 in the two positions corresponding to the narrow and the wide fields of view. The carriage arrangement of the present invention provides for the movement of the lens assembly 55 which includes the lens 56 and array 58, both along the optical axis and transverse to the optical axis, between the positions diagrammatically shown in FIG. 2, to achieve the respective fields of view. The mechanism by which this is accomplished is illustrated in somewhat diagrammatic form in FIGS. 3 and 4 and in greater detail in FIGS. 6–9.

Reference may first be had to FIGS. 3 and 4, where certain functional parts of the scanning carriage 22 are shown in diagrammatic form for the purpose of clarity, and other parts have been omitted for the same reason. In further explanation, while the views of FIGS. 3 and 4 are diagrammatic and excess structural parts have been omitted for the purpose of clarity, nevertheless the parts shown have corresponding parts identified by corresponding reference numerals as illustrated in the views of the carriage, FIGS. 7 through 10, respectively.

The carriage 22 may thus be considered as being supported on the document handler frame by rails or supports, not shown in FIGS. 3 and 4, by which the entire carriage may move either left or right of the page, in the direction of the arrows 64, when either repositioning with respect to the document scanning platens or when traversing during scanning operations. The lens assembly 55 includes a first yoke member 66 and a second yoke member 67 which are slidably mounted for movement longitudinally of the carriage on a pair of guide rods 69 and 68, which rods are in turn carried on end frame support members 70 and 72. The rod support member 70 is, in turn, mounted for limited transverse sliding movement on a fixed rail 74 which forms part of the carriage frame structure 75.

The yoke member 66 supports the lens 56 and the interfitted yoke member 67 supports the CCD array 58. Generally, the yoke members 66 and 67, making up the lens assembly 55, move together as a unit on the rods 68, 69 between the wide and narrow fields of view illustrated respectively in FIGS. 3 and 4, but limited movement is provided between the respective yoke members 67 and 66, for the purpose of focusing the CCD array 58 with respect to the lens 56. In the position of the parts illustrated in FIG. 3, the lens 56 is spaced further from the document on a platen and accordingly occupies the wide field of view whereas the lens 56, in the position of the parts as shown in FIG. 4, is spaced closer to the platen and defines the narrower field of view.

Detent means which normally urge the lens assembly 55 into either the wide or narrow fields of view includes a lever mounted roller 80, mounted to the carriage frame by a pivotal lever 82, and controlled by a centering pre-loaded spring 84. Since the lever 82 is pivotally mounted to a portion of the carriage frame, the position of the lever 82 is fixed, at it pivot point, relative to the position of the carriage.

The roller 80 is guided for movement in a generally Z-shaped cam slot 85 formed in the yoke 66, the ends of which are transversely notched at 86 and 87, forming sloping or inclined cam surfaces 88 at each end thereof. When the roller 80 occupies the position at its extreme limits of travel, as shown respectively in the views of FIGS. 3 and 4, the roller itself will rest upon one of the inclined surfaces 88, and when travelling between the extreme positions, the roller will follow the contour defined by the transversely inclined slot 85.

As noted above, the CCD support yoke 67 is mounted on the rods 68, 69 for limited axial movement with respect to the lens support yoke 66. The position of these yokes in the wide field of view position, as shown in FIG. 3, is defined by a first threaded stop 90 in the end frame member 72 which engages the yoke 66 in the wide field of view, and by a second threaded stop member 91 which, in the wide field of view, engages the yoke 67 and defines the position of the array 58 with respect to the lens 56.

In the narrow field of view shown in FIG. 4, an additional threaded stop 93, on the frame member 70, engages the yoke 66 and defines the narrow field of view. A compression spring 94 urges the array yoke 67 into engagement with an adjustable stop 95 carried on the lens yoke 66, for positioning the array 58 with respect to the lens 56 to maintain focus in the narrow field of view.

The lens assembly yoke 66 is provided with an integral laterally extending tongue 100 which is selectively engageable by a fixed stop diagrammatically illustrated at 102, during certain traversing movement of the carriage 22 as a whole in the direction of the arrows 64, for causing the lens assembly to move relative to its supporting carriage on the guide rails 68 and 69. Further, the lateral position of the lens assembly with respect to the carriage as a whole is controlled by a stop 104 on the frame 75 which defines the lateral position of the lens assembly in the wide field of view, and an inverted threaded stop 105 which defines the corresponding position in the narrow field of view, as shown in FIG. 4.

Figure 5:
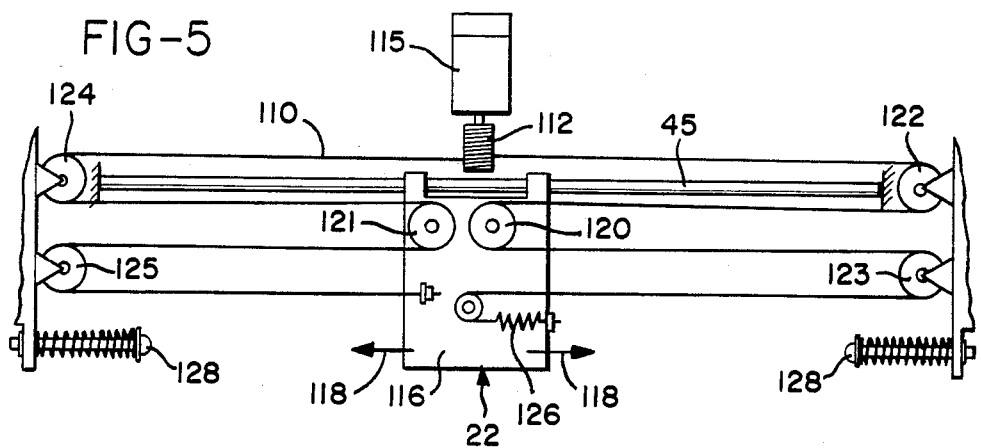
FIG. 5 is a diagrammatic illustration of the carriage drive arrangement.

The carriage traverse or drive arrangement which moves the carriage longitudinally of the machine is diagrammatically shown in FIG. 5 in which a drive cable 110 is wrapped around a grooved pulley 112 of a servo or computer controlled drive motor 115. A pulley bracket 116 is received and clamped in a machined pocket 117 (FIG. 7) of the carriage 22 and drives the carriage in the direction of the arrows 118, under the influence of the servo drive motor 115. The cable 110 is guided over idler pulleys 120 and 121 on the bracket 116 and is threaded over idler pulleys 122, 123 at one end of the carriage travel on the document handler and idler pulleys 124 and 125 on the other end, with the remote ends of the cable again terminated on the bracket, so that rotation of the servo drive motor 115 causes the carriage 22 to traverse along its length of travel generally parallel to the respective platens. The grooved pulley 112 provides a high coefficient of friction between the cable 110 and the pulley. Preferably, the pulley 112 is provided with a hard anodized surface to minimize wear.

While one end of the cable 110 is connected directly to the bracket 116, the other end is connected through a tensioner spring 126, as shown in FIG. 5. Spring cushioned stops 128 absorb impact at the extreme ends of carriage travel on the document handler.

The carriage 22 is mounted for traversing movement on guide rail means 45 forming a part of the frame of the automatic document handler. As shown in FIG. 6, the guide rail means actually consists of a pair of rollers. A roller 130, on one side of the carriage frame 75 rides on a longitudinally extending flat topped rail 132. The opposite side of the carriage provides means defining a guide in the form of inverted Teflon coated V-guides 135 which ride on an upwardly facing V-rail 136. The interfitting V parts between the carriage and the rail 136 provide for lateral stability of the carriage.

The means defining a stop member 102 is also best shown in FIG. 6. The raising and lower of the stop member 102 is controlled by a push-pull electric solenoid 138 through a pivoting lever 139. The lever 139 and solenoid 138 are fixedly mounted on a generally U-shaped bracket 140 to the frame of the document handler. Energization of the solenoid 138 lifts the stop member 102 into interference with the path of movement of the tongue 100 on the lens yoke 66. A fragment of the tongue 100 is shown in FIG. 6.

Figure 11A:
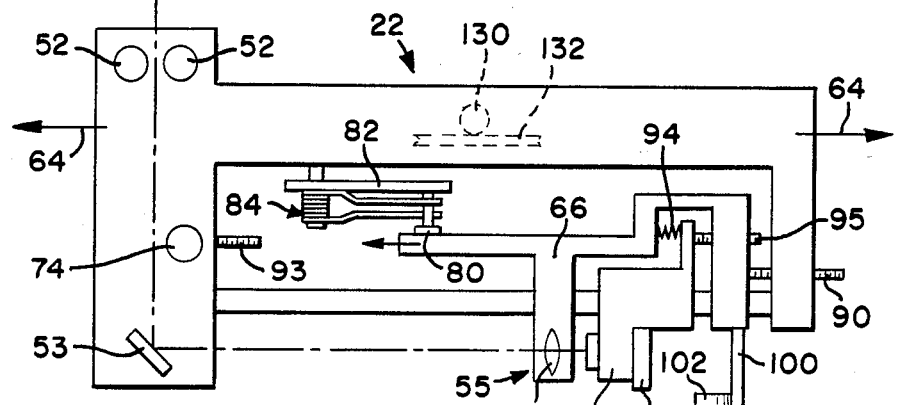
FIGS. 11A and 11B diagrammatically illustrate the positions of the parts of the scanner respectively between wide and narrow fields of view.
Figure 11B:
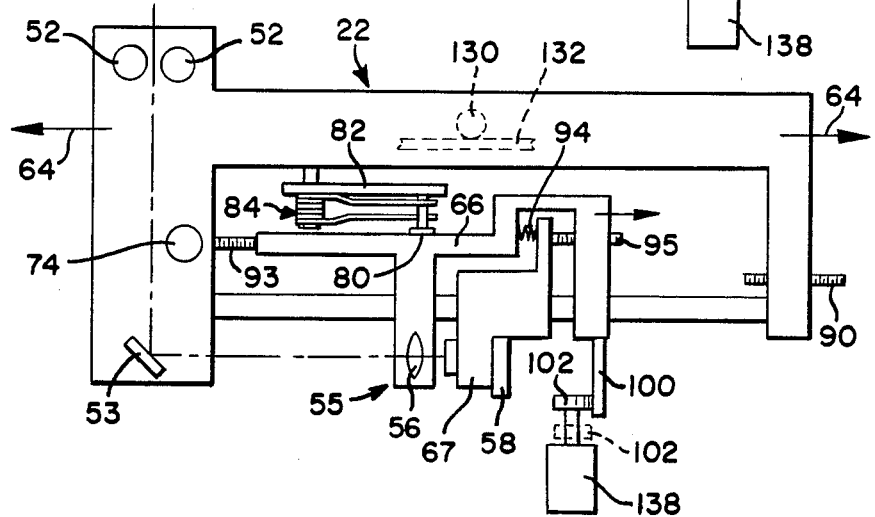
Figure 7:
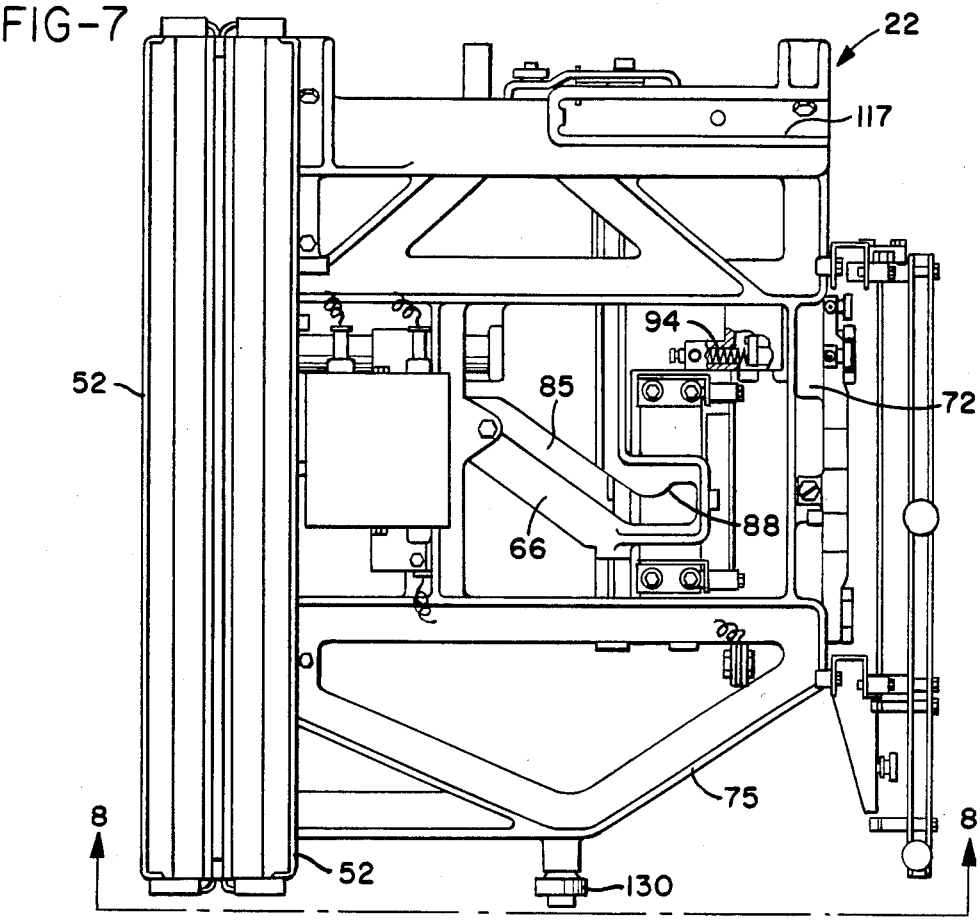
FIG. 7 is a top view of the scanning carriage.
Figure 8:
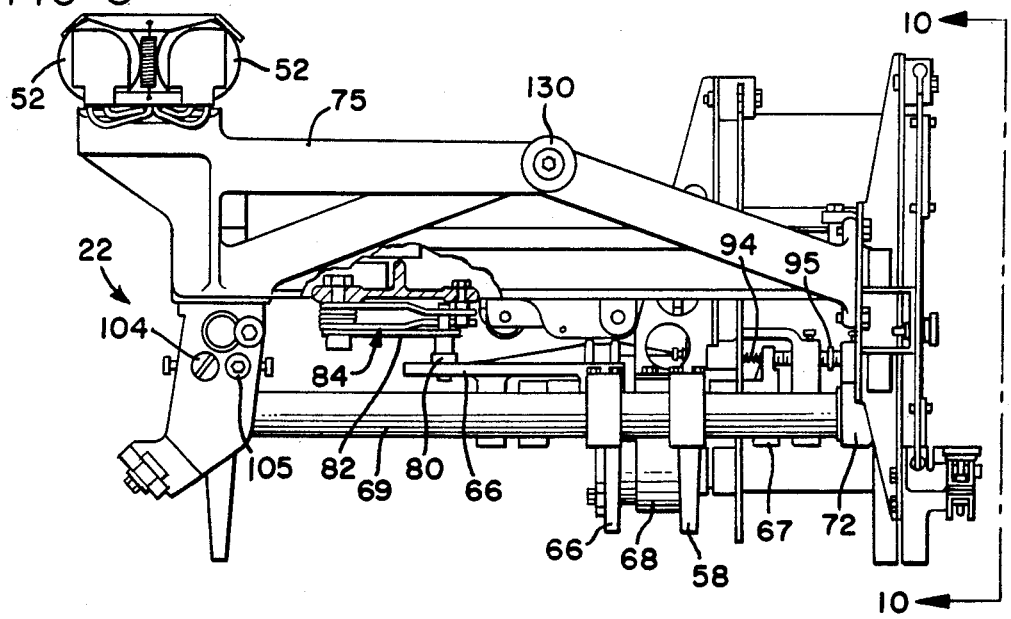
FIG. 8 is a side view of the carriage; looking along 8—8 of FIG. 7.

The sequence of operation of the invention can most readily be followed by reference to FIGS. 3 and 4 and to the diagrams of FIGS. 11A and 11B. The carriage 22 normally occupies a "home" position, which is a position shown in full line in FIG. 1, in which the carriage 22 is in scanning relation to the platen 32. When it is desired to change the existing field of view, the servomotor 115 is operated to send the entire carriage to the left, as viewed in FIG. 1 and in FIGS. 11A and 11B, a finite and arbitrary distance, and thereafter to return the carriage to its home position as shown. This arbitrary movement, for the purpose of shifting the field of view, may be in the order of about five inches.

Assuming first that the lens 56 is at the narrow field of view (FIGS. 11B and 4) and it is desired to shift the lens assembly 55 in the carriage to the wide field of view (FIGS. 11A and 3). The following sequences are followed: The stop member 102 is extended into the path of the tongue 100 by operating the solenoid 138. The carriage 22 is moved on its guideways to the left to the point where the tongue 100 comes into interference with the stop member 102. Carriage movement is continued under the influence of the servomotor until the carriage stalls, indicating that the lens yoke 66 has come into contact with the stop 90. Actually, when the tongue 100 makes contact with the stop member 102, the lens assembly 55 is prevented from following the motion of the rest of the carriage and the carriage continues to move until the lens yoke contacts the stop 90 which correspond to the wide field of view. The stoppage of motion is sensed by the electronic drive which senses the stalled or non-moving condition of the motor 115. The carriage drive servo system then returns the carriage back to its home position, and the solenoid operated stop is retracted.

During this movement, that is from the narrow to the wide field of view, the lens assembly 55 has also been shifted laterally on the rod 74 due to the action of the roller 80 within the cam slot 85. The pre-loaded centering spring 84 takes about four pounds of force to deflect the lever 82 intially from either of its detent positions. During the detenting portion of the cam movement, the lever is deflected in such a direction that it provides the necessary force components to keep the lens assembly jammed against its stops in either of its stable positions. However, during the lateral movement of the cam action, the roller 80 acts like a fixed roller so that the lens assembly is forced to move on the rail 74 perpendicular to the optical axis, since the resistance to the sideways motion on the rail 74 is considerably less than the four pounds of force required to deflect the roller. In this field of view, the stop 91 engages the CCD yoke 67 and defines the focus position of the array.

When it is desired to shift from the wide to the narrow field of view, that is, between the conditions of FIGS. 3 and 4 or FIGS. 11A and 11B respectively, the carriage 22 is again sent from its home position to the left about five inches. Upon coming to the end of this travel, the solenoid 138 is operated to extend the stop member 102, and now the carriage is moved to the right until the stop member is contacted by the tongue 100, and movement of the carriage is continued until stall is reached. The lens assembly has now been shifted back to its narrow field position. At this point, it is necessary to reverse the carriage slightly to release the tongue from the stop member. The solenoid is then retracted, and the carriage is moved back to its home position. During the time that the stop member is in contact with the tongue 100, the lens assembly is returned from the wide to the narrow field of view, with the lens assembly yoke 66 coming into contact with the adjustable stop 93, the CCD array moving slightly away from the lens to come into contact with its adjustable focus stop 95, and the frame 70 coming into contact with contact with the transverse stop 105.

It will accordingly be seen that this invention provides an effective and rapid arrangement by which a lens assembly may be shifted on a scanning carriage between wide and narrow fields of view for the purpose of repositioning a lens and, additionally, repositioning a photoelectric pick-up arrangement, with respect to such fields. The arrangement thus eliminates the need for a dedicated motor or linear actuator arrangement for lens and field of view shifting.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A copying machine optical system adapted for operation at two fields of view in which said fields have a common margin, comprising:
   a scanning carriage movable along one document scanning path on said machine,
   a lens assembly on said carriage including a lens,
   photoelectric pick-up means associated with said lens assembly for receiving an image from said lens at each of said fields of view, means mounting said assembly on said carriage for movement transversely of said path between first and second positions corresponding to the optical axis of each of said fields of view in translation along a path parallel to said axis, means for causing said carriage to move along said path, and means selectively engageable with said lens assembly during said carriage movement for causing said assembly to move between its said first and second positions concurrently with said carriage movement.

2. The copying machine optical system of claim 1 further comprising means in said lens assembly for repositioning said photoelectric pick-up means with respect to the position of said lens in each of said fields of view to compensate for shifts in the focus plane of said lens between said fields of view.

3. The system of claim 1 in which said fields of view are defined at a copy platen, and in which said path of carriage movement is parallel to said platen.

4. A scanning carriage arrangement for a document copier in which the carriage is mounted for movement parallel to the plane of a document platen and said carriage is adapted to scan two fields of view including a narrow field of view and a wide field of view joined along a common margin, the improvement comprising a lens assembly on said carriage including a lens and a CCD array, means mounting said assembly for movement between two discrete positions on said carriage corresponding to each of said fields of view, detent means holding said assembly in each of said positions on said carriage, and means for causing said assembly to move from one of said detent positions to the other including stop means temporarily engageable with said assembly during said movement of said carriage to effect relative movement of said carriage with respect to said assembly, said detent means normally holding said lens assembly in one or the other of its said positions.

5. The scanning carriage arrangement of claim 4 further including adjustable stop means on said carriage defining said detent positions.

6. The scanning carriage arrange of claim 4 further comprising means on said lens assembly mounting said CCD array for movement along the optical axis of said lens between first and second focus positions, and further stop means operable to urge said CCD array in one or the other of its said focus positions corresponding to the field of view being scanned by said lens assembly.

7. The scanning carriage arrangement of claim 4 in which said detent means includes a Z-shaped cam slot formed in said lens assembly, an arm pivotally mounted on said carriage and having roller means received in said cam slot, and a pre-loaded centering spring means urging said roller into one or the other of the ends of said cam slot.

8. An optical scanning carriage arrangement for a document copying machine which is adapted for operation at two different fields of view at a document copying platen in which said fields of view have a common margin, comprising, a scanning carriage which is movable on said machine along a first path parallel to said platen, said carriage having a lens assembly thereon, means on said carriage mounting said lens assembly for movement along two perpendicular paths, one of said paths being parallel to said scanning path and the other path being normal thereto, stop means on said carriage defining the limits of movement of said lens assembly along said respective paths at each of said fields of view, detent means on said carriage normally urging said lens assembly in either of its respective said positions, and means overcoming said detent means for causing said lens assembly to move from one of its said positions along said paths to the other of its said positions along said paths.

9. The arrangement of claim 8 in which said last named means includes carriage drive means for moving said scanning carriage along said first path, and temporary stop means movable into the path of said lens assembly for causing relative movement of said lens assembly along its said mutually perpendicular paths with concurrent movement of said carriage.

10. The arrangement of claim 8 in which said detent means includes a diagonally sloping cam surface on said lens assembly terminating at detent surfaces at the opposite ends thereof, an arm pivotally mounted on said carriage, cam follower means on said arm adapted to move between said detent surfaces along said cam surface, and spring means on said arm urging said cam follower against one or the other of said detent surfaces while permitting movement of said cam follower along said sloping cam surface concurrently with movement of said lens assembly by said stop means to guide said lens assembly along said intersecting paths.

11. A copying machine optical system adapted for operation at two fields of view at a platen in which the center of such fields are laterally offset from each other comprising:

a scanning carriage, a lens assembly on said carriage including a lens, photoelectric pick-up means associated with said lens assembly for receiving an image from said lens at each of said fields of view, means mounting said carriage for movement in one direction, means mounting said assembly on said carriage for movement transversely on said carriage of said path between first and second positions corresponding to the optical axis of each of said fields of view in translation along a path parallel to said axis, means for causing said carriage to move along in said one direction, and means selectively engageable with said lens assembly during said carriage movement for causing said assembly to move between its said first and second positions concurrently with said carriage movement.

12. The copying machine optical system of claim 11 further comprising means in said lens assembly for repositioning said photoelectric pick-up means with respect to the position of said lens in each of said fields of view to compensate for shifts in the focus plane of said lens between said fields of view.

13. The system of claim 12 including adjustable stop means on said carriage defining the position of said lens assembly on said carriage in each of said fields of view.

* * * * *